United States Patent
Manabe et al.

(10) Patent No.: US 9,772,212 B2
(45) Date of Patent: Sep. 26, 2017

(54) LIQUID LEVEL DETECTOR

(71) Applicant: AISAN KOGYO KABUSHIKI KAISHA, Obu-shi (JP)

(72) Inventors: Yuichi Manabe, Inazawa (JP); Sumito Takeda, Nagoya (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 75 days.

(21) Appl. No.: 15/010,002

(22) Filed: Jan. 29, 2016

(65) Prior Publication Data
US 2016/0223384 A1    Aug. 4, 2016

(30) Foreign Application Priority Data
Jan. 30, 2015  (JP) .................................. 2015-016681

(51) Int. Cl.
*G01F 23/38* (2006.01)

(52) U.S. Cl.
CPC .................................. *G01F 23/38* (2013.01)

(58) Field of Classification Search
CPC .......... B60K 2015/03217; G01F 23/38; G01F 23/32; G01F 23/34; G01F 23/363; G01F 23/54; G01F 23/36; G01F 23/62
See application file for complete search history.

(56) References Cited

U.S. PATENT DOCUMENTS

| | | | | |
|---|---|---|---|---|
| 4,229,973 A * | 10/1980 | Hara | ....................... | G01F 23/32 73/317 |
| 6,401,533 B1 * | 6/2002 | Gier | .................... | B60K 15/077 73/313 |
| 6,453,741 B1 * | 9/2002 | Beck, II | ................... | G01F 23/38 340/623 |
| 6,564,632 B2 * | 5/2003 | Ross, Jr. | ................. | G01F 23/38 73/290 R |
| 6,679,116 B2 * | 1/2004 | Ross, Jr. | ................. | G01F 23/34 73/290 R |
| 6,851,315 B2 * | 2/2005 | Bergsma | ............... | G01F 23/363 73/290 R |

(Continued)

FOREIGN PATENT DOCUMENTS

JP  2013-0242174 A  12/2013
JP  2014-126371 A   7/2014
(Continued)

*Primary Examiner* — David A Rogers
(74) *Attorney, Agent, or Firm* — Shumaker, Loop & Kendrick, LLP

(57) ABSTRACT

In a liquid level detector, a first clearance may expand as at least one of a rotator and a supporter swells with a target liquid. The first clearance may be a smaller one of an inner clearance between an inner circumference side of a first guide rail and an inner circumference portion and an outer clearance between an outer circumference side of the first guide rail and the outer circumference portion, in a state where the rotator and the supporter are not swelled with the target liquid. A second clearance may contract to become smaller than the first clearance as at least one of the rotator and the supporter swells with the target liquid. The second clearance may be a larger one of the inner clearance and the outer clearance in the state where the rotator and the supporter are not swelled with the target liquid.

7 Claims, 7 Drawing Sheets

(56) References Cited

U.S. PATENT DOCUMENTS

| | | | | |
|---|---|---|---|---|
| 6,976,394 B2* | 12/2005 | Kleinen | G01F 23/38 | 116/227 |
| 7,093,485 B2* | 8/2006 | Newman | G01F 23/32 | 73/317 |
| 7,165,450 B2* | 1/2007 | Jamnia | G01F 23/38 | 73/317 |
| 7,201,052 B2* | 4/2007 | Lee | G01F 23/38 | 73/317 |
| 7,377,163 B2* | 5/2008 | Miyagawa | G01F 23/38 | 73/305 |
| 7,458,261 B2* | 12/2008 | Miyagawa | G01F 23/363 | 73/290 R |
| 7,673,509 B2* | 3/2010 | Cochran | G01F 23/38 | 73/311 |
| 8,136,396 B2* | 3/2012 | Mundo | G01F 23/38 | 73/317 |
| 8,671,750 B2* | 3/2014 | Fukuhara | G01F 23/38 | 73/314 |
| 9,453,756 B2* | 9/2016 | Ogasawara | G01F 23/38 | |
| 2004/0003660 A1* | 1/2004 | Fukuhara | G01F 23/38 | 73/319 |
| 2004/0182150 A1* | 9/2004 | Okada | G01F 23/36 | 73/313 |
| 2004/0231416 A1* | 11/2004 | Kumagai | G01F 23/38 | 73/313 |
| 2005/0103103 A1* | 5/2005 | Newman | G01F 23/32 | 73/313 |
| 2005/0146323 A1* | 7/2005 | Kleinen | G01R 33/07 | 324/207.26 |
| 2006/0272405 A1* | 12/2006 | Feher | G01F 23/38 | 73/313 |
| 2007/0290681 A1* | 12/2007 | Yasuda | G01F 23/38 | 324/207.25 |
| 2008/0202231 A1* | 8/2008 | Sohn | G01F 23/38 | 73/317 |
| 2008/0231267 A1* | 9/2008 | Miyagawa | G01F 23/38 | 324/207.25 |
| 2010/0223993 A1* | 9/2010 | Shimizu | G01F 23/36 | 73/317 |
| 2011/0016970 A1* | 1/2011 | Sakamaki | G01F 23/363 | 73/317 |
| 2012/0011931 A1* | 1/2012 | Ichisawa | G01F 23/38 | 73/317 |
| 2012/0111108 A1* | 5/2012 | Hashimoto | G01F 23/363 | 73/317 |
| 2015/0107355 A1* | 4/2015 | Iryo | G01F 23/72 | 73/313 |
| 2015/0338263 A1* | 11/2015 | Iryo | G01F 23/38 | 73/317 |
| 2016/0161321 A1* | 6/2016 | Miyagawa | G01F 23/38 | 73/317 |
| 2016/0178427 A1* | 6/2016 | Tesar | G01F 23/38 | 73/313 |
| 2016/0313172 A1* | 10/2016 | Nakamura | F02M 37/106 | |

FOREIGN PATENT DOCUMENTS

| | | |
|---|---|---|
| JP | 2014-133279 A | 7/2014 |
| JP | 2014-0137298 A | 7/2014 |

* cited by examiner

LIQUID LEVEL DETECTOR

CROSS-REFERENCE TO RELATED APPLICATION

This application claims priority to Japanese Patent Application No. 2015-016681 filed on Jan. 30, 2015, the contents of which are hereby incorporated by reference into the present application.

TECHNICAL FIELD

Disclosed herein are liquid level detectors configured to detect a level of liquid (for example, a device configured to detect an amount of fuel stored in a fuel tank of an automobile or the like).

BACKGROUND

Japanese Patent Application Publication No. 2014-137298 discloses a device that detects a liquid level of fuel in a fuel tank. This device includes a body, a magnet holder rotatably held by the body, a magnet that integrally rotates with the magnet holder, a float that floats on a surface of the fuel, an arm that has one end to which the float is fixed, and the other end to which the magnet holder is fixed, and a Hall element housed in the body.

The magnet holder has a shaft hole disposed on a rotational axis. The body has a shaft portion fitted into the shaft hole of the magnet holder. A slight clearance is provided along an entire circumference between an outer circumference surface of the shaft portion and an inner circumference surface of the shaft hole. A portion of the inner circumference surface of the shaft hole slides relative to the outer circumference surface of the shaft portion to thereby cause the magnet holder to rotatably move relative to the body. The magnet holder is configured of POM (i.e., polyacetal), and the body is configured of PPS (i.e., polyphenylene sulfide).

SUMMARY

POM, which is a material of the magnet holder, more easily swells with fuel than PPS, which is a material of the body. For this reason, an inner diameter of the shaft hole disposed in the magnet holder expands by swelling, while an outer diameter of the shaft portion disposed in the body expands at a relatively much smaller degree. Consequently, the clearance between the outer circumference surface of the shaft portion and the inner circumference surface of the shaft hole expands due to the swelling of the magnet holder. This may cause an increase in rattling of the magnet holder relative to the body, and in such a case the liquid level height may not be detected accurately.

The present disclosure discloses suppresses rattling of a rotator relative to a supporter due to swelling, where the rotator is fixed to the arm and the supporter is rotatably supporting the rotator.

The application discloses a liquid level detector. The liquid level detector may comprise a float; an arm attached to the float and configured to convert a vertical motion of the float into a rotary motion of the arm; a rotator configured of a first resin and fixed to the arm; a sensor configured to detect the rotary motion of the arm; and a supporter configured of a second resin having a swelling ratio relative to a target liquid that is different from a swelling ratio of the first resin of the rotator relative to the target liquid, and rotatably supporting the rotator on the sensor, the target liquid being a detection target. The supporter may comprise a first guide rail for the rotator. The first guide rail may extend along a rotation direction of the arm. The rotator may comprise an inner circumference portion disposed along an inner circumference of the first guide rail; and an outer circumference portion disposed along an outer circumference of the first guide rail. An inner clearance may be a clearance between an inner circumference side of the first guide rail and the inner circumference portion. An outer clearance may be a clearance between an outer circumference side of the first guide rail and the outer circumference portion. A first clearance may expand as at least one of the rotator and the supporter swells with the target liquid. The first clearance may be a smaller one of the inner clearance and the outer clearance in a state where the rotator and the supporter are not swelled with the target liquid. A second clearance may contract to become smaller than the first clearance as at least one of the rotator and the supporter swells with the target liquid. The second clearance may be a larger one of the inner clearance and the outer clearance in the state where the rotator and the supporter are not swelled with the target liquid.

In the above-described configuration, the rotator is disposed with a clearance relative to each of the inner circumference and the outer circumference of the first guide rail. The rotator may thereby rotate smoothly relative to the supporter. In the state where the rotator and the supporter are not swelled with the liquid, a degree of backlash rattling of the rotator relative to the supporter maybe suppressed to be equal to or smaller than a width of the relatively small first clearance. The swelling ratio of the rotator differs from the swelling ratio of the supporter, and hence when at least one of the rotator and the supporter swells with the liquid, the first clearance expands, and the second clearance contracts to become smaller than the first clearance. According to this configuration, even if the first clearance expands due to swelling, the second clearance contracts to become smaller than the first clearance, and hence the degree of the backlash rattling of the rotator relative to the supporter maybe suppressed to be equal to or smaller than a width of the relatively small second clearance. The backlash rattling of the rotator relative to the supporter due to swelling can thereby be suppressed.

DETAILED DESCRIPTION

Figure 1:
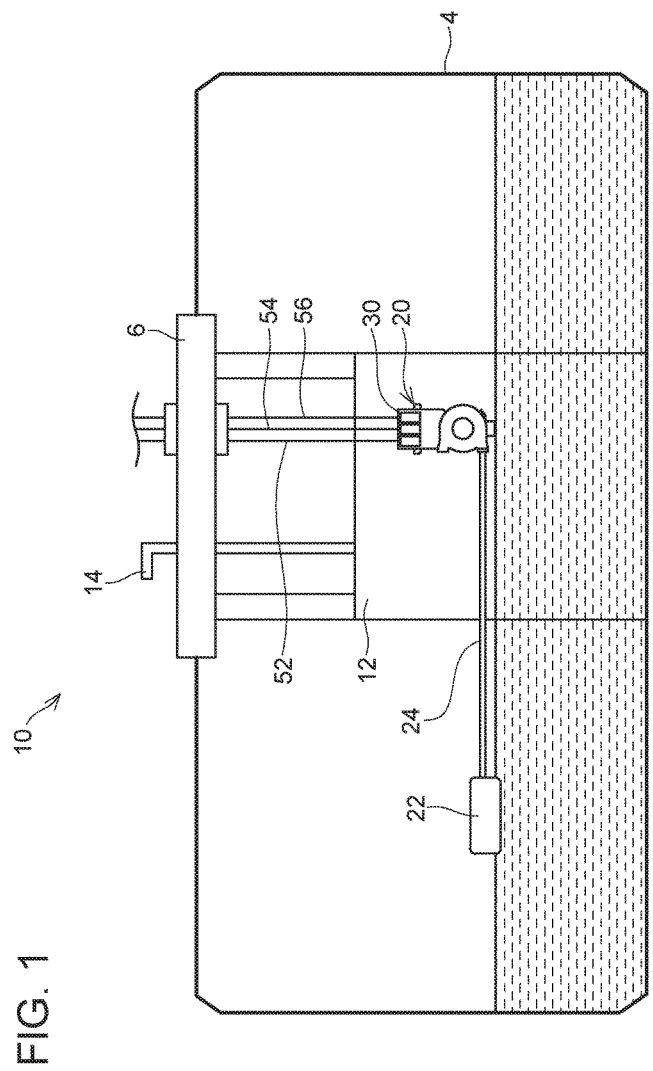
FIG. 1 shows a configuration of a fuel pump module.

Some features of embodiments described herein will be listed. Notably, technical features described herein are each independent technical element, and exhibit technical usefulness thereof solely or in combinations.

(Feature 1)

In a liquid level detector, the swelling ratio of the rotator relative to the target liquid may be higher than the swelling ratio of the supporter relative to the target liquid the first clearance may be the outer clearance, and the second clearance may the inner clearance. On the other hand, the swelling ratio of the supporter relative to the target liquid may be higher than the swelling ratio of the rotator relative to the target liquid the first clearance may be the inner clearance, and the second clearance may the outer clearance.

(Feature 2)

In the liquid level detector, the supporter may comprise a second guide rail for the arm. The second rail may extend along the rotation direction of the arm. The arm may comprise a curved part configured of a material having a low swelling ratio relative to the target liquid and curving along the second guide rail. A third clearance may be larger than the first clearance and smaller than the second clearance. The third clearance may be a clearance between the second guide rail and the curved part in the state where the rotator and the supporter are not swelled with the target liquid. A minimum clearance among the first clearance, the second clearance and the third clearance may shift in an order of the first clearance, the third clearance, and the second clearance as at least one of the rotator and the supporter swells with the target liquid. According to this configuration, even in the situation where both of the first and second clearances become relatively large, backlash rattling of the rotator relative to the supporter can be suppressed by the third clearance.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved liquid level detectors, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

As shown in FIG. 1, a fuel pump module 10 is a unit configured to supply, to an engine (not illustrated), fuel in a fuel tank 4 mounted in a vehicle such as an automobile, motorcycle. The fuel pump module 10 is placed in the fuel tank 4.

The fuel pump module 10 includes a fuel pump unit 12 and a fuel amount detector 20. The fuel pump unit 12 is housed in the fuel tank 4. The fuel pump unit 12 is attached to a set plate 6 configured to close an opening in the fuel tank 4. The fuel pump unit 12 sucks in the fuel in the fuel tank 4, pressurizes the fuel thus sucked in, and discharges the fuel. The fuel discharged from the fuel pump unit 12 is supplied to the engine through a discharge port 14.

The fuel amount detector 20 includes a float 22, an arm 24 to which the float 22 is fixed, and a magnetic sensor unit 30 configured to detect a rotation angle of the arm 24. The float 22 floats on the surface of the fuel in the fuel tank 4 and moves up and down depending on the liquid level of the fuel. The float 22 is rotatably attached to a leading end of the arm 24. A base end of the arm 24 is supported to be rotatable with respect to the magnetic sensor unit 30. For this reason, when the float 22 moves up and down depending on the liquid level of the fuel in the fuel tank 4, the arm 24 thereby swingably rotates with respect to the fuel pump unit 12. The float 22 is attached to the leading end of the arm 24. The base end of the arm 24 is attached to the magnetic sensor unit 30.

Figure 2:
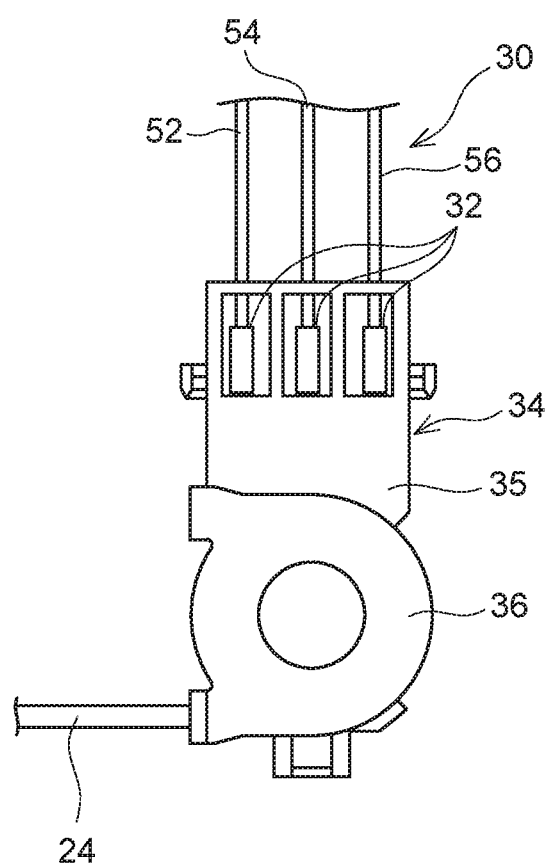
FIG. 2 is a front view of a magnetic sensor unit.
Figure 3:
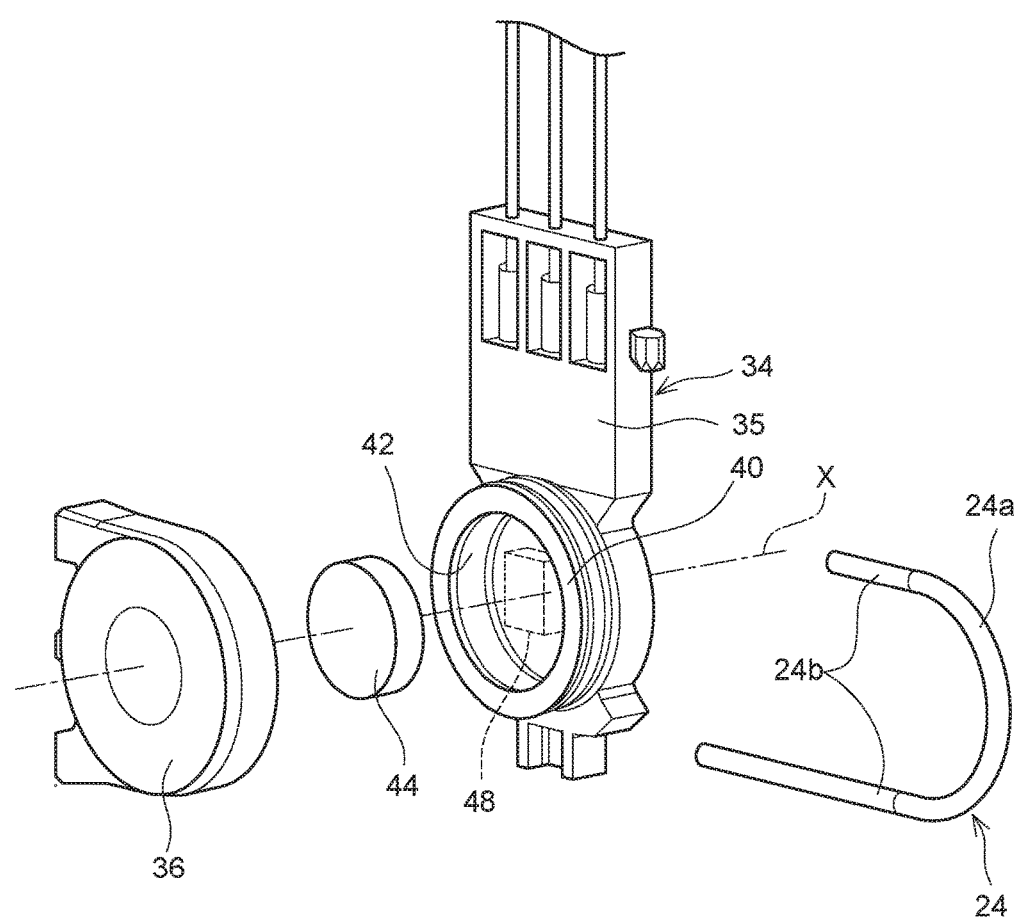
FIG. 3 is an exploded perspective view of the magnetic sensor unit.

As shown in FIGS. 2 and 3, the magnetic sensor unit 30 rotatably supports the arm 24 relative to the fuel pump unit 12. Notably, in FIG. 2 and the following drawings, a portion of the arm 24 on the float 22's side is omitted. The magnetic sensor unit 30 includes a supporter 34, a magnet 44, a rotator 36, a magnetic sensor 48, and a lead wire 32.

The supporter 34 is fixed to an outer wall of the fuel pump unit 12. The supporter 34 is configured of a resin. The supporter 34 includes a main body 35, a guide rail 42, and a guide rail 40. The main body 35 has a flat-plate shape. A back surface of the main body 35 is attached to the outer wall of the fuel pump unit 12. The guide rails 40 and 42 are disposed on a front surface side of the main body 35.

The guide rail 42 projects from a front surface of the main body 35. The guide rail 42 has a cylindrical shape that allows a rotational axis X of the arm 24 to serve as a central axis of the cylindrical shape.

The guide rail 40 is disposed at one end of the guide rail 42 in a rotational axis X's direction (i.e., an end opposite to the supporter 34). The guide rail 40 has an annular shape that allows the rotational axis X to serve as the center. An inner diameter of the guide rail 40 has the same length as that of an inner diameter of the guide rail 42. An inner circumference surface of the guide rail 40 is located coplanar with an inner circumference surface of the guide rail 42. An outer circumference surface of the guide rail 40 is located more outwardly in a radial direction of the guide rail 42 with respect to an outer circumference surface of the guide rail 42.

Figure 7:
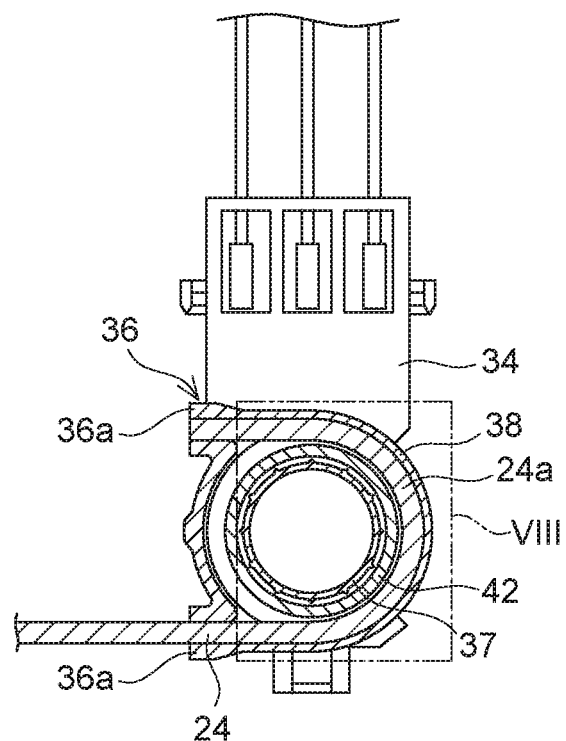
FIG. 7 is a cross-sectional view taken along a VII-VII cross-section of FIG. 4.
Figure 8:
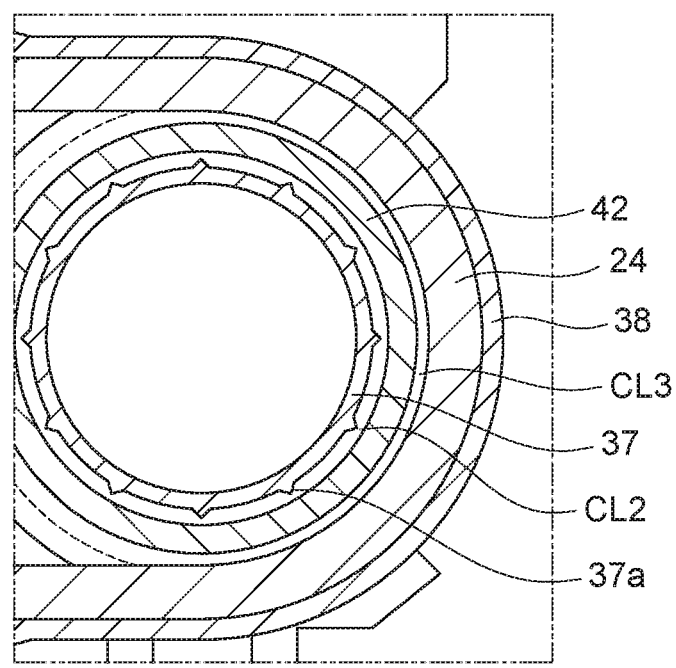
FIG. 8 is an enlarged view of a VIII region of FIG. 7.

The arm 24 is disposed at the outer circumference surface of the guide rail 42. The arm 24 is configured of a metal material that hardly swells relative to the fuel (e.g., stainless steel). The term "hardly swells" herein refers to a state where changes in diameters and the like of the arm caused by the swelling are so small, or none, that such changes are ignorable in terms of the operation of the arm. The arm 24 is configured of a columnar rod-like member. The arm 24 has a curved part 24a that is curved into a semicircular shape at an end part opposite to the float 22. The curved part 24a has a shape that conforms to the outer circumference surface of the guide rail 42. FIGS. 7 and 8 are cross-sectional views that show a cross-section passing through the central position of the guide rail 42 in the rotational axis X's direction. If the center of the semicircular shape of the curved part 24a is disposed on the rotational axis X, the curved part 24a of the arm 24 is opposed to the outer circumference surface of the guide rail 42, with a clearance CL3 interposed therebetween. The arm 24 further has a pair of opposing parts 24b opposed to each other. The guide rail 42 is inserted into the opposing parts 24b to thereby cause the arm 24 to be attached to the supporter 34. The arm 24 is disposed between the main body 35 and the guide rail 40. The movement of the arm 24 in the rotational axis X's direction is thereby regulated.

Figure 5:
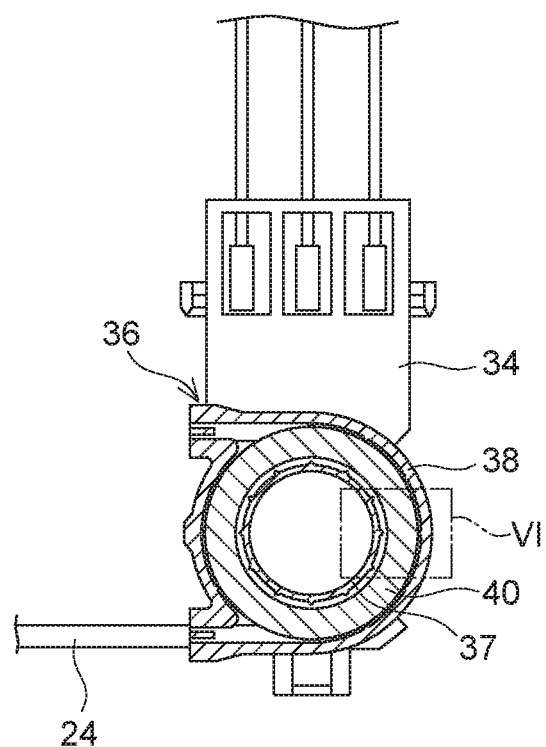
FIG. 5 is a cross-sectional view taken along a V-V cross-section of FIG. 4.

The rotator 36, to which the magnet 44 has been attached, is attached to the supporter 34 and to the arm 24. FIG. 5 shows a cross-sectional view of a cross-section that passes through an intermediate position of the guide rail 40 in the rotational axis X's direction. Notably, FIG. 5 omits the magnet 44. As shown in FIG. 5, the rotator 36 is slidably disposed at the supporter 34 in a rotation direction of the arm 24, with the rotational axis X being set as the center. The rotator 36 is configured of POM (i.e., polyacetal). The rotator 36 has an outer circumference portion 38 that has a cylindrical shape and covers an outer circumference edge of each of the arm 24 and the guide rail 40, and an inner circumference portion 37 that has a cylindrical shape and is disposed on an inner circumference side of the guide rail 40.

Figure 6:
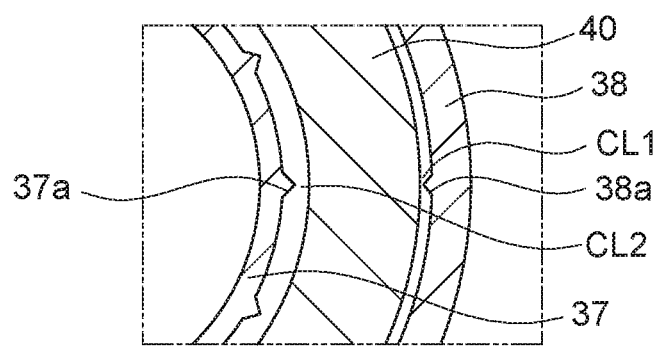
FIG. 6 is an enlarged view of a VI region of FIG. 5.

The outer circumference portion 38 is disposed along the outer circumference edge of the guide rail 40. The outer circumference portion 38 is disposed along the guide rail 40, except for a part that extends in a direction along which the arm 24 is apart from the guide rail 42 (i.e., a part where a notch 36a described later is disposed). As shown in FIG. 6, a plurality of projections 38a are disposed at an inner circumference surface of the outer circumference portion 38. The projections 38a are spaced from each other in the rotation direction of the arm 24. The projections 38a project from the inner circumference surface of the outer circumference portion 38 toward the guide rail 40. According to this configuration, a contact area between the inner circumference surface of the outer circumference portion 38 and the guide rail 40 can be reduced. Consequently, friction force generated when the outer circumference portion 38 slides relative to the guide rail 40 can be reduced. If the central axis of the outer circumference portion 38 is disposed on the rotational axis X, leading ends of the projections 38a are opposed to the outer circumference edge of the guide rail 40, with a clearance CL1 interposed therebetween.

As shown in FIG. 5, the inner circumference portion 37 is disposed along an inner circumference edge of the guide rail 40. The inner circumference portion 37 is disposed along the entire circumference of the guide rail 40, in other words, disposed to encircle around the rotational axis X. As shown in FIG. 6, a plurality of projections 37a are disposed at the outer circumference surface of the inner circumference portion 37, the projections 37a being spaced from each other in the rotation direction of the arm 24. The projections 37a project from the outer circumference surface of the inner circumference portion 37 toward the guide rail 40. According to this configuration, a contact area between the outer circumference surface of the inner circumference portion 37 and the guide rail 40 can be reduced. Consequently, friction force generated when the inner circumference portion 37 slides relative to the guide rail 40 can be reduced. If the central axis of the inner circumference portion 37 is disposed on the rotational axis X, leading ends of the projections 37a are opposed to the inner circumference edge of the guide rail 40, with a clearance CL2 interposed therebetween.

Figure 4:
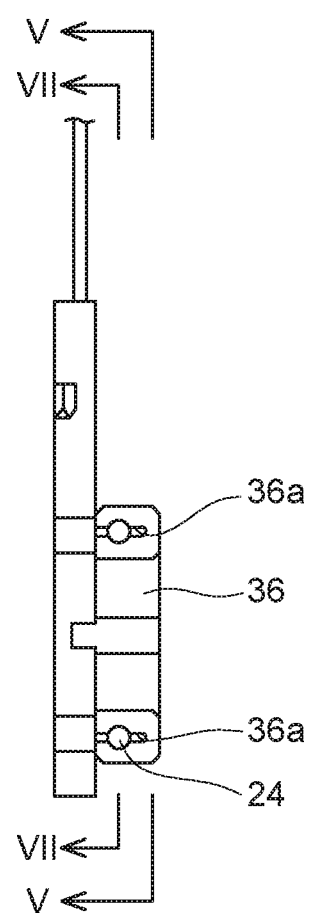
FIG. 4 is a side view of the magnetic sensor unit.

As shown in FIG. 4, the rotator 36 further has two notches 36a. The rotator 36 clamps the arm 24 with these two notches 36a to thereby be fixed to the arm 24. The rotator 36 thereby rotates in synchronization with a rotation of the arm 24.

The rotator 36 holds the magnet 44 housed in the inner circumference portion 37. The magnet 44 has a columnar shape that allows the rotational axis X to serve as the central axis. The magnet 44 is fixed on an inner circumference side of the inner circumference portion 37.

As shown in FIG. 3, the supporter 34 houses the magnetic sensor 48. The magnetic sensor 48 is disposed behind the magnet 44 (on the fuel pump unit 12's side). The supporter 34 is fixed to the magnetic sensor 48, and the arm 24 and the rotator 36 can rotate relative to the magnetic sensor 48. For this reason, the magnet 44 fixed to the rotator 36 can rotate relative to the magnetic sensor 48.

The magnetic sensor 48 detects a rotary motion of the arm 24, and based on that detected result, outputs to a fuel meter (not illustrated) a signal that represents an analog amount corresponding to an amount of fuel stored in the fuel tank 4 (see FIG. 1). The signal that represents the analog amount is, for example, an analog voltage signal, a signal subjected to PWM (an abbreviation of Pulse width modulation), a signal transmitted with use of digital communication such as CAN (an abbreviation of Controller Area Network) or LAN (an abbreviation of Local Area Network), and the like. The magnetic sensor 48 is a magnetic-type sensor that detects a rotation angle of the arm 24, based on changes in magnetic field of the magnet 44, and a known sensor that utilizes a Hall IC, for example, can be used therefor. Specifically, the magnetic sensor 48 has a Hall element that detects an orientation of the magnetic field of the magnet 44. If a position of the magnet 44 relative to the magnetic sensor 48 is displaced in a direction vertical to the rotational axis X, there may be a case where the rotation angle of the arm 24 cannot be detected accurately. The magnetic sensor 48 is covered by the supporter 34 so as not to be exposed to an outside.

As shown in FIG. 2, the three lead wires 32 extend from the magnetic sensor 48. The three lead wires 32 are connected to a power source line 52, an output line 54, and a ground line 56, respectively. The power source line 52, the output line 54, and the ground line 56 penetrate the set plate 6 and are connected to the fuel meter.

(Relations Among Clearances CL1, CL2, and CL3)

Next, with reference to FIG. 9, there will be described changes in size of the clearances CL1, CL2, and CL3 depending on the swelling ratio of the rotator 36, in the case where the rotator 36 swells with fuel. The swelling ratio is a ratio of a difference between a dimension of a part when the part is not swelled with liquid (detection target liquid), and a dimension of the part that actually swells, to a difference between the dimension of the part that is not swelled and a dimension of the part when the part swells to the state where it cannot swell any more with the detection target liquid. The part in the present embodiment is the rotator 36 and the detection target liquid in the present embodiment is fuel. The dimension of the part when the part is not swelled with the detection target liquid is referred to as "L0". The dimension of the part that actually swells is referred to as "L2". The dimension of the part when the part swells to the state where it cannot swell any more with the detection target liquid is referred to as "L1". The swelling ratio is thus expressed as: $(L2-L0)/(L1-L0) \times 100$. The dimension of the part is determined by a dimension of a particular section of the part, such as an outer diameter of the outer circumference portion 38 of the rotator 36, for example.

Figure 9:
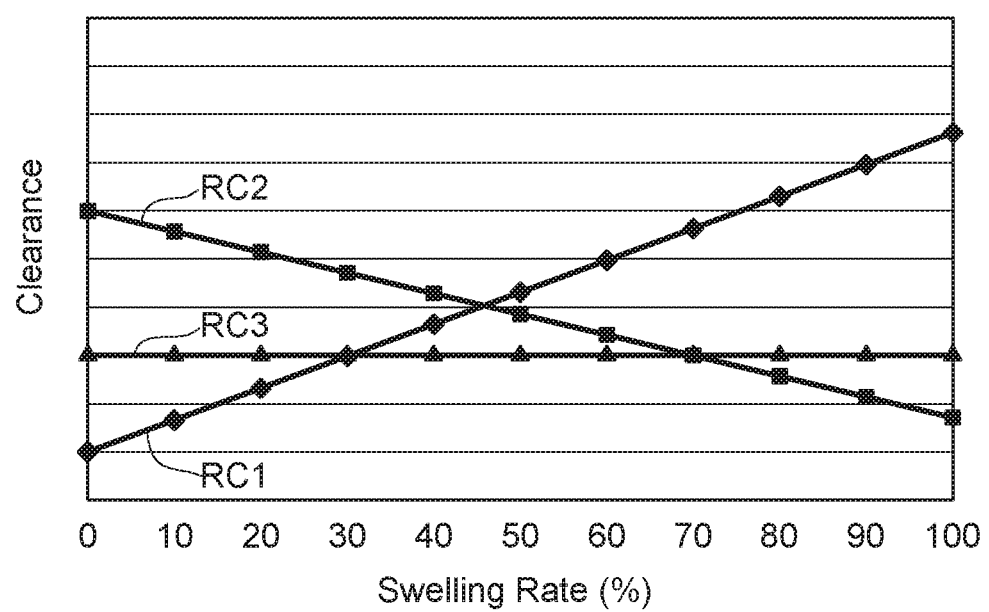
FIG. 9 is a graph that represents changes in size of clearances relative to a swelling ratio of a rotator.

The graph in FIG. 9 shows a simulation result of the sizes of the clearances CL1, CL2, and CL3 relative to the swelling ratio of the rotator 36, in the case where the magnetic sensor unit 30 in the present embodiment is soaked in fuel to be actually used (e.g., gasoline, or a mixed fuel of gasoline and alcohol). Notably, the sizes of the clearances CL1, CL2, and CL3 represent the sizes in the state where the rotator 36 is not displaced relative to the supporter 34 (i.e., in the state where the rotation center of the arm 24 is on the rotational axis X). In the graph in FIG. 9, the axis of abscissa shows the swelling ratio of the rotator 36, while the axis of ordinate shows the sizes of the clearances. A result RC1 shows a size of the clearance CL1, a result RC2 shows a size of the clearance CL2, and a result RC3 shows a size of the clearance CL3.

Notably, the supporter 34 is configured of PPS, which is a resin material that hardly swells relative to the fuel. In other words, the swelling ratio of the supporter 34 relative to the fuel is negligibly small, in comparison with the swelling ratio of the rotator 36. Moreover, the arm 24 hardly swells relative to the fuel. For this reason, swelling of the arm 24 and the supporter 34 is not taken into consideration in the simulation.

As the swelling ratio of the rotator 36 increases, the clearance CL1 is increased. This is because an inner diameter of the outer circumference portion 38 is increased to thereby cause the leading ends of the projections 38a to be apart from the outer circumference edge of the guide rail 40. On the other hand, as the swelling ratio of the rotator 36 increases, the clearance CL2 is decreased. This is because an outer diameter of the inner circumference portion 37 is increased to thereby cause the leading ends of the projections 37a to be close to the inner circumference edge of the guide rail 40. Moreover, the clearance CL3 between the guide rail 42 and the arm 24 remains unchanged regardless of the swelling ratio of the rotator 36.

If the swelling ratio of the rotator 36 is relatively low, as in the case where the swelling ratio ranges from 0% (i.e., in the state where the rotator 36 is not swelled at all) to approximately 30%, the clearance CL1 becomes the minimum. In this situation, the guide rail 40 and the outer circumference portion 38 slide to thereby cause the arm 24 to rotate relative to the supporter 34. Moreover, in this situation, the rotator 36 is allowed to be displaced from the supporter 34, by the size of the clearance CL1.

When the swelling ratio of the rotator 36 becomes 30% or higher, the clearance CL1 expands and the clearance CL3 becomes the minimum. In this situation, the guide rail 42 and the arm 24 slide to thereby cause the arm 24 to rotate relative to the supporter 34. Moreover, in this situation, the rotator 36 is allowed to be displaced from the supporter 34, by the size of the clearance CL3. When the swelling ratio of the rotator 36 becomes much higher, the clearance CL1 further expands, the clearance CL2 contracts, and the clearance CL2 becomes the minimum. In this situation, the guide rail 40 and the inner circumference portion 37 slide to thereby cause the arm 24 to rotate relative to the supporter 34. Moreover, in this situation, the rotator 36 is allowed to be displaced from the supporter 34, by the size of the clearance CL2.

(Effects of the Present Embodiment)

In the present embodiment, the minimum clearance shifts among the clearances CL1, CL2, and CL3 depending on the swelling ratio of the rotator 36. Consequently, it is possible to suppress an increase in allowed displacement amount of the rotator 36 relative to the supporter 34, caused as the swelling ratio of the rotator 36 increases. Even if the rotator 36 swells, backlash rattling of the rotator 36 relative to the supporter 34 can thereby be suppressed.

Moreover, in the present embodiment, the rotator 36 is configured of POM, and the supporter 34 is configured as PPS. POM more easily deforms elastically than PPS does. For this reason, the rotator 36 can easily be attached to the supporter 34. Moreover, a material that is relatively less deformed elastically and less swells can be used for the supporter 34, to thereby suppress deformation of the supporter 34.

(Correspondence)

As is clear from the description above, the clearance CL1 corresponds to the "first clearance", the clearance CL2 corresponds to the "second clearance", and the clearance CL3 corresponds to the "third clearance".

(Variation 1)

In the above-described embodiment, each of the guide rails 40 and 42 has a shape that encircles around the rotational axis X. The guide rail 40, however, may not encircle around the rotational axis X. For example, the guide rail 40 may be a plurality of projections that projects from a front surface of the main body 35. The plurality of projections may be disposed to be spaced from each other, along the rotation direction of the arm 24. Generally, the guide rail 40 only needs to be disposed along the rotation direction of the arm 24, and have a shape that can rotatably support the rotator 36.

(Variation 2)

Similarly, the guide rail 42 may not encircle around the rotational axis X. For example, the guide rail 42 may have a plurality of partially-cylindrical shapes that is disposed along the rotation direction of the arm 24. Generally, the guide rail 42 only needs to be disposed along the rotation direction of the arm 24, and have a shape that can guide the arm 24 in the rotation direction of the arm 24.

(Variation 3)

In the above-described embodiment, the inner circumference portion 37 has a shape that encircles around the rotational axis X. The inner circumference portion 37, however, may not encircle around the rotational axis X. For example, the inner circumference portion 37 may have a plurality of partially-cylindrical shapes that are disposed along the rotation direction of the arm 24. Notably, in the case where the inner circumference portion 37 is located within a range in which the arm 24 can rotate relative to the supporter 34, at least a portion of the inner circumference portion 37 is preferably opposed to the guide rail 40. Furthermore, even in the case where the inner circumference portion 37 is located within a range in which the arm 24 can rotate, and where the rotator 36 is displaced in any direction on a plane vertical to the rotational axis X, at least the inner circumference portion 37 and the guide rail 40 preferably abut against each other.

(Variation 4)

Similarly, the outer circumference portion 38 may have a plurality of partially-cylindrical shapes disposed along the rotation direction of the arm 24, for example. Notably, in the case where the outer circumference portion 38 is located within a range in which the arm 24 can rotate, at least a portion of the outer circumference portion 38 is preferably opposed to the guide rail 40, and furthermore, even in the case where the outer circumference portion 38 is located within the range in which the arm 24 can rotate, and where the rotator 36 is displaced in any direction on the plane vertical to the rotational axis X, at least the outer circumference portion 38 and the guide rail 40 preferably abut against each other.

(Variation 5)

In the above-described embodiment, the supporter 34 is configured of PPS, and the rotator 36 is configured of POM. However, a material of each of the supporter 34 and the rotator 36 is not limited thereto. For example, the rotator 36 may be configured of nylon or PBT (a polybutylene terephthalate resin). The swelling ratio of each of nylon and PBT relative to the fuel is higher than the swelling ratio of PPS relative to the fuel.

(Variation 6)

In the above-described embodiment, the supporter 34 is configured of PPS, which has a relatively low swelling ratio, whereas the rotator 36 is configured of POM, which has a relatively high swelling ratio. However, the supporter 34 may be configured of a material that has a relatively high swelling ratio (e.g., POM), whereas the rotator 36 may be configured of a material that has a relatively low swelling ratio (e.g., PPS). In this case, in the state where the supporter 34 and the rotator 36 are not swelled, the clearance CL2 may be set smaller than the clearance CL1. As the supporter 34 swells, the clearance CL2 may expand and the clearance CL1 may contract. In the present variation, the clearance CL2 corresponds to the "first clearance", and the clearance CL1 corresponds to the "second clearance.

(Variation 7)

In the above-described embodiment, there may be a case where the size of the clearance CL3 becomes smaller than the size of each of the clearances CL1 and CL2, depending on swelling of the rotator 36. However, the size of the clearance CL3 may be larger than the size of each of the clearances CL1 and CL2, regardless of swelling of the rotator 36.

(Variation 8)

The "liquid level detector" in the present disclosure may be a device that detects an amount of liquid in a container, for example, an amount of water stored in a water storage tank, and the like, other than the fuel amount detector 20 that detects the amount of fuel in the fuel tank 4.

(Variation 9)

Aside from the magnetic sensor 48a described above, the "sensor" only needs to be a sensor that detects a rotary motion of the arm 24.

(Variation 10)

In the above-described embodiment, the magnetic sensor 48 outputs to the fuel meter an analog signal corresponding to an amount of fuel stored in the fuel tank 4. However, the magnetic sensor 48 may detect a rotary motion of the arm 24, and based on the detected result, output to the fuel meter an analog signal corresponding to a liquid level height of the fuel stored in the fuel tank 4. In this case, when the analog signal output from the magnetic sensor 48 is input to an external CPU, the CPU may determine a liquid level height of the fuel stored in the fuel tank 4, and display on a display the liquid level height thus determined.

(Variation 11)

In the above-described embodiment, the outer circumference portion 38 has the plurality of projections 38a. However, the outer circumference portion 38 may not have the plurality of projections 38a. In this case, the inner circumference surface of the outer circumference portion 38 may have concave and convex portions formed thereat. In this case, the clearance CL1 may be a clearance between the inner circumference surface of the outer circumference portion 38 and the outer circumference edge of the guide rail 40. The same applies to the inner circumference portion 37.

What is claimed is:

1. A liquid level detector comprising:
   a float;
   an arm attached to the float and configured to convert a vertical motion of the float into a rotary motion of the arm;
   a rotator configured of a first resin and fixed to the arm;
   a sensor configured to detect the rotary motion of the arm; and
   a supporter configured of a second resin having a swelling ratio relative to a target liquid that is different from a swelling ratio of the first resin of the rotator relative to the target liquid, and rotatably supporting the rotator on the sensor, the target liquid being a detection target,
   wherein
   the supporter comprises a first guide rail for the rotator, the first guide rail extending along a rotation direction of the arm,
   the rotator comprises:
      an inner circumference portion disposed along an inner circumference of the first guide rail; and
      an outer circumference portion disposed along an outer circumference of the first guide rail,
   an inner clearance is a clearance between an inner circumference side of the first guide rail and the inner circumference portion,
   an outer clearance is a clearance between an outer circumference side of the first guide rail and the outer circumference portion,
   a first clearance expands as at least one of the rotator and the supporter swells with the target liquid, the first clearance being a smaller one of the inner clearance and the outer clearance in a state where the rotator and the supporter are not swelled with the target liquid, and
   a second clearance contracts to become smaller than the first clearance as at least one of the rotator and the supporter swells with the target liquid, the second clearance being a larger one of the inner clearance and the outer clearance in the state where the rotator and the supporter are not swelled with the target liquid.

2. The liquid level detector as in claim 1, wherein
   the swelling ratio of the rotator relative to the target liquid is higher than the swelling ratio of the supporter relative to the target liquid,
   the first clearance is the outer clearance, and
   the second clearance is the inner clearance.

3. The liquid level detector as in claim 2, wherein
   the supporter further comprises a second guide rail for the arm, the second rail extending along the rotation direction of the arm,
   the arm comprises a curved part configured of a material having a low swelling ratio relative to the target liquid and curving along the second guide rail,
   a third clearance is larger than the first clearance and smaller than the second clearance, the third clearance being a clearance between the second guide rail and the curved part in the state where the rotator and the supporter are not swelled with the target liquid, and
   a minimum clearance among the first clearance, the second clearance and the third clearance shifts in an order of the first clearance, the third clearance, and the second clearance as at least one of the rotator and the supporter swells with the target liquid.

4. The liquid level detector as in claim 3, wherein
   the arm is configured of a metal material that hardly swells relative to the target liquid.

5. The liquid level detector as in claim 1, wherein
the supporter further comprises a second guide rail for the arm, the second rail extending along the rotation direction of the arm,
the arm comprises a curved part configured of a material having a low swelling ratio relative to the target liquid and curving along the second guide rail,
a third clearance is larger than the first clearance and smaller than the second clearance, the third clearance being a clearance between the second guide rail and the curved part in the state where the rotator and the supporter are not swelled with the target liquid, and
a minimum clearance among the first clearance, the second clearance and the third clearance shifts in an order of the first clearance, the third clearance, and the second clearance as at least one of the rotator and the supporter swells with the target liquid.

6. The liquid level detector as in claim 1, wherein
the first resin is polyphenylene sulfide,
the second resin is polyacetal,
the target liquid is fuel of a vehicle, and
the first clearance is the outer clearance, and
the second clearance is the inner clearance.

7. The liquid level detector as in claim 1, wherein
the target liquid is fuel of an automobile.

* * * * *